United States Patent
Lee et al.

(10) Patent No.: US 11,822,109 B2
(45) Date of Patent: Nov. 21, 2023

(54) POLARIZING PLATE, POLARIZING PLATE ADHESIVE COMPOSITION FOR SAME, AND OPTICAL DISPLAY APPARATUS COMPRISING SAME

(71) Applicant: Samsung SDI Co., Ltd., Yongin-si (KR)

(72) Inventors: Tae Hyun Lee, Suwon-si (KR); Mi Yeon Yu, Suwon-si (KR); Seung Jun Lee, Suwon-si (KR); Woo Jin Jeong, Suwon-si (KR); Il Jin Kim, Suwon-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 0 days.

(21) Appl. No.: 17/272,880

(22) PCT Filed: Dec. 20, 2019

(86) PCT No.: PCT/KR2019/018172
§ 371 (c)(1),
(2) Date: Mar. 2, 2021

(87) PCT Pub. No.: WO2020/138853
PCT Pub. Date: Jul. 2, 2020

(65) Prior Publication Data
US 2021/0318478 A1    Oct. 14, 2021

(30) Foreign Application Priority Data
Dec. 24, 2018 (KR) .................. 10-2018-0168549

(51) Int. Cl.
*G02B 5/30* (2006.01)
*G02B 1/14* (2015.01)
(Continued)

(52) U.S. Cl.
CPC .............. *G02B 5/3058* (2013.01); *C09J 9/02* (2013.01); *C09J 125/18* (2013.01); *C09J 129/04* (2013.01);
(Continued)

(58) Field of Classification Search
CPC ........ G02B 5/3058; G02B 1/14; C09J 125/18; C09J 129/04; C09J 165/00; C09J 9/02;
(Continued)

(56) References Cited

U.S. PATENT DOCUMENTS

2005/0224765 A1* 10/2005 Hsu ..................... H01L 51/0037
252/500
2009/0317634 A1* 12/2009 Suh ......................... G02B 1/18
428/354
(Continued)

FOREIGN PATENT DOCUMENTS

| CN | 101921478 A | 12/2010 |
|---|---|---|
| CN | 104898196 A | 9/2015 |

(Continued)

OTHER PUBLICATIONS

International Search Report for corresponding Application No. PCT/KR2019/018172 dated Apr. 3, 2020, 4pp.
(Continued)

*Primary Examiner* — Sophie Hon
(74) *Attorney, Agent, or Firm* — Lewis Roca Rothgerber Christie LLP (57) ABSTRACT

Provided are a polarizing plate, a polarizing plate adhesive composition for same, and an optical display apparatus comprising same, the polarizing plate comprising: a polarizer; and a polarizing plate adhesive layer and a protective layer which are sequentially formed on at least one surface of the polarizer, wherein the polarizing plate adhesive layer comprises poly(ethylenedioxythiophene) poly(styrene-
(Continued)

sulfonate) (PEDOT:PSS), and the polarizing plate adhesive layer has a surface resistance of about $1 \times 10^8$ to about $1 \times 10^{12}$ (Ω/□).

12 Claims, 1 Drawing Sheet

(51) Int. Cl.
  *C09J 9/02* (2006.01)
  *C09J 125/18* (2006.01)
  *C09J 129/04* (2006.01)
  *C09J 165/00* (2006.01)
  *G02F 1/1335* (2006.01)

(52) U.S. Cl.
  CPC .............. *C09J 165/00* (2013.01); *G02B 1/14* (2015.01); *G02F 1/133528* (2013.01); *C09J 2203/318* (2013.01); *C09K 2323/04* (2020.08); *G02F 2202/022* (2013.01); *G02F 2202/28* (2013.01)

(58) Field of Classification Search
  CPC .......... C09J 2203/318; G02F 1/133528; G02F 2202/28; G02F 2202/022; C09K 2323/04
  See application file for complete search history.

(56) References Cited

U.S. PATENT DOCUMENTS

| | | | | |
|---|---|---|---|---|
| 2010/0028564 A1* | 2/2010 | Cheng | ................ | G02F 1/13363 428/1.1 |
| 2010/0209723 A1* | 8/2010 | Tanaka | ................... | C09J 129/04 525/61 |
| 2016/0298004 A1* | 10/2016 | Kim | ......................... | G02B 1/14 |
| 2016/0357079 A1* | 12/2016 | Chen | ..................... | G06F 3/0412 |

FOREIGN PATENT DOCUMENTS

| | | | | |
|---|---|---|---|---|
| CN | 106928842 | A | | 7/2017 |
| CN | 108368393 | A | | 8/2018 |
| JP | 2013-72951 | A | | 4/2013 |
| JP | 2013-186252 | A | | 9/2013 |
| JP | 2013186252 | A | * | 9/2013 |
| KR | 10-2006-0019413 | A | | 3/2006 |
| KR | 10-2009-0071716 | A | | 7/2009 |
| KR | 10-2010-0095388 | A | | 8/2010 |
| KR | 20100095388 | A | * | 8/2010 |
| KR | 10-2011-0107586 | A | | 10/2011 |
| KR | 10-2013-0066817 | A | | 6/2013 |
| KR | 20130066817 | A | * | 6/2013 |
| KR | 10-2013-0113916 | A | | 10/2013 |
| KR | 10-2018-0066771 | A | | 6/2018 |
| KR | 10-2018-0085019 | A | | 7/2018 |
| KR | 10-2018-0120316 | A | | 11/2018 |
| KR | 102403280 | B1 | * | 5/2022 ............... G02B 5/30 |

OTHER PUBLICATIONS

Korean Office Action in corresponding Korean Patent Application No. 10-2018-0168549, Korean Office Action dated Mar. 24, 2021 (5 pgs.).

Chinese Office Action dated Aug. 25, 2022, including Search Report dated Aug. 19, 2022, for Application No. 201980082799.4, 8 pages.

* cited by examiner

POLARIZING PLATE, POLARIZING PLATE ADHESIVE COMPOSITION FOR SAME, AND OPTICAL DISPLAY APPARATUS COMPRISING SAME

CROSS-REFERENCE TO RELATED APPLICATIONS

This application is a U.S. National Phase Patent Application of International Application Number PCT/KR2019/018172, filed on Dec. 20, 2019, which claims priority to Korean Patent Application Number 10-2018-0168549, filed on Dec. 24, 2018, the entire contents of both of which are incorporated herein by reference.

TECHNICAL FIELD

The present invention relates to a polarizing plate, a bonding composition for polarizing plates and an optical display device comprising the same.

BACKGROUND ART

A liquid crystal display includes polarizing plates bonded to both surfaces of a liquid crystal cell via adhesive films. In addition, a touch sensor is usually mounted on a display screen of the liquid crystal display. There are various types of touch sensors, such as a capacitive type, a resistive type, an optical type, an ultrasound type, and an electromagnetic type. Among them, the capacitive touch panel is generally used in the art. In recent years, a liquid crystal display including a capacitive sensor as a touch sensor unit to provide a touch sensing function is used in the art.

Conventional liquid crystal display devices employ technique in which a touch sensor is stacked on a viewing side of a liquid crystal panel. This technique is called an Add-On type. However, the Add-On type has a problem of increasing a thickness of the liquid crystal display devices. In order to improve the above problem, another technique in which a touch sensor is mounted inside a liquid crystal panel has been considered. This another technique is called an In-Cell type. This type has an advantage that the thickness of the liquid crystal display device can be reduced compared to the Add-On type.

However, the In-Cell type needs a predetermined sheet resistance, preferably $1\times10^8 \Omega/\square$ to $1\times10^{12} \Omega/\square$ at the outside the liquid crystal panel to avoid problems in touch performance. To this end, an anchor layer including a conductive polymer may be formed on the outside of the liquid crystal panel. However, when the device is left at high temperature and high humidity for a long period of time, the sheet resistance may be lowered, and the addition of an anchor layer may also increase a thickness of the liquid crystal display device, just like the add-on type. Accordingly, there is a need for a panel with excellent touch function even if being left at high temperature and high humidity for a long period of time.

The background technique of the present invention is disclosed in JP 2013-072951 and the like.

DISCLOSURE

Technical Problem

It is one object of the present invention to provide a polarizing plate comprising a bonding layer having a surface resistance of about $1\times10^8 \Omega/\square$ to about $1\times10^{12} \Omega/\square$ before the polarizing plate is left under conditions of high temperature and high humidity for a long period of time and a surface resistance of about $1\times10^8 \Omega/\square$ to about $1\times10^{12} \Omega/\square$ even after the polarizing plate is left under conditions of high temperature and high humidity for a long period of time.

It is another object of the present invention to provide a polarizing plate comprising a bonding layer for polarizing plates having a low ratio of the surface resistance after the polarizing plate is left under conditions of high temperature and high humidity for a long period of time to the surface resistance before the polarizing plate is left under conditions of high temperature and high humidity for a long period of time.

It is a further object of the present invention to provide a polarizing plate having excellent touch performance and touch sensitivity at room temperature and even at high temperature and high humidity and having short recolor time against an electrostatic shock thereby obtaining high reliability, when the polarizing plate is laminated on a liquid crystal panel (in-cell liquid crystal panel) including a touch sensor therein.

It is a further object of the present invention to provide a polarizing plate having excellent adhesive strength between a polarizer and a protective layer, good durability and water resistance.

It is a further object of the present invention to provide a bonding composition for polarizing plates capable of imparting the above effects to the bonding layer and the polarizing plate.

Technical Solution

One aspect of the present invention relates to polarizing plate.

1. The polarizing plate comprises a polarizer; and a bonding layer for polarizing plates and a protective layer sequentially formed on at least one surface of the polarizer; wherein the bonding layer for polarizing plates comprises a poly(ethylenedioxythiophene) poly(styrenesulfonate)(PEDOT:PSS), further wherein the bonding layer for polarizing plates has a surface resistance of about $1\times10^8 \Omega/\square$ to about $1\times10^{12} \Omega/\square$.

2. In Embodiment 1, the bonding layer for polarizing plates may have a surface resistance of about $1\times10^8 \Omega/\square$ to about $1\times10^{12} \Omega/\square$ after leaving the polarizing plate under conditions of 85° C. and 85% RH for 250 hours.

3. In Embodiments 1-2, the polarizing plate may have a surface resistance ratio of greater than about 0 and less than or equal to about 1, according to Equation 1:

$$\text{surface resistance ratio} = SR2/SR1 \quad [\text{Equation 1}]$$

(where SR1 is a surface resistance (unit: $\Omega/\square$) of the bonding layer for polarizing plates before leaving the polarizing plate under conditions of 85° C. and 85% RH for 250 hours, and SR2 is a surface resistance (unit: $\Omega/\square$) of the bonding layer for polarizing plates after leaving the polarizing plate under conditions of 85° C. and 85% RH for 250 hours).

4. In Embodiments 1-3, the bonding layer for polarizing plates may comprise poly(ethylenedioxythiophene) poly(styrenesulfonate)(PEDOT:PSS) in an amount of about 1 wt % to about 50 wt %.

5. In Embodiments 1-4, the bonding layer for polarizing plates may be formed of a bonding composition for polarizing plates comprising poly(ethylenedioxythiophene) poly(styrenesulfonate)(PEDOT:PSS), a polyvinyl alcohol resin and a salt of glyoxylic acid.

6. In Embodiments 1-5, the poly(ethylenedioxythiophene) poly(styrenesulfonate)(PEDOT:PSS) is present in an amount of about 5 parts by weight to about 30 parts by weight and the salt of glyoxylic acid is present in an amount of about 1 part by weight to about 50 parts by weight, based on 100 parts by weight of the polyvinyl alcohol resin.

7. In Embodiments 1-6, the salt of glyoxylic acid may include at least one of lithium glyoxylate, sodium glyoxylate, potassium glyoxylate, magnesium glyoxylate, calcium glyoxylate, strontium glyoxylate, and barium glyoxylate.

Another aspect of the present invention relates to a bonding composition for polarizing plates.

1. The bonding composition for polarizing plates comprises a polyvinyl alcohol resin, a poly(ethylenedioxythiophene) poly(styrenesulfonate)(PEDOT:PSS) and a salt of glyoxylic acid.

2. In Embodiment 1, the poly(ethylenedioxythiophene) poly(styrenesulfonate)(PEDOT:PSS) may be present in an amount of about 5 parts by weight to about 30 parts by weight and the salt of glyoxylic acid may be present in an amount of about 1 part by weight to about 50 parts by weight, based on 100 parts by weight of the polyvinyl alcohol resin.

3. In Embodiments 1-2, the salt of glyoxylic acid may include at least one of lithium glyoxylate, sodium glyoxylate, potassium glyoxylate, magnesium glyoxylate, calcium glyoxylate, strontium glyoxylate, and barium glyoxylate.

4. In Embodiments 1-3, the polyvinyl alcohol resin may comprise a polyvinyl alcohol resin having a degree of modification by an acetoacetyl group of about 1 mol % to about 30 mol %.

5. In Embodiments 1-4, the bonding composition for polarizing plates may have a surface resistance at 25° C. of about $1\times10^8$ to about $1\times10^{12}$ ($\Omega$/□) measured with a cured specimen obtained by curing the bonding composition for polarizing plate, and may have a surface resistance at 25° C. of about $1\times10^8$ to about $1\times10^{12}$ ($\Omega$/□) measured with a specimen obtained by leaving the cured specimen under conditions of 85° C. and 85% RH for 250 hours.

The optical display device of the present invention comprises the foregoing polarizing plate.

Advantageous Effects

The present invention provides a polarizing plate comprising a bonding layer for polarizing plates having a surface resistance of about $1\times10^8\Omega$/□ to about $1\times10^{12}\Omega$/□ before the polarizing plate is left under conditions of high temperature and high humidity for a long period of time and having a surface resistance of about $1\times10^8\Omega$/□ to about $1\times10^{12}\Omega$/□ even after the polarizing plate is left under conditions of high temperature and high humidity for a long period of time.

The present invention provides a polarizing plate comprising a bonding layer for polarizing plates having a low ratio of the surface resistance after the polarizing plate is left under conditions of high temperature and high humidity for a long period of time to the surface resistance before the polarizing plate is left under conditions of high temperature and high humidity for a long period of time.

The present invention provides a polarizing plate having excellent touch performance and touch sensitivity at room temperature and even at high temperature and high humidity and having short recolor time against an electrostatic shock thereby obtaining high reliability, when the polarizing plate is laminated on a liquid crystal panel (in-cell liquid crystal panel) including a touch sensor therein.

The present invention provides a polarizing plate having excellent adhesive strength between a polarizer and a protective layer, good durability, and water resistance.

The present invention provides a bonding composition for polarizing plates capable of imparting the above-described effects to the bonding layer and the polarizing plate.

BEST MODE

Hereinafter, embodiments of the present invention will be described in detail with reference to the accompanying drawings. However, it should be understood that the present invention is not limited to the following embodiments and may be embodied in different ways. The following embodiments are provided to provide thorough understanding of the invention to those skilled in the art. In the drawings, it is to understood that sizes, lengths, thicknesses and the like of each component may be exaggerated or not illustrated to scale in the accompanying drawings for ease of description of the present invention and the present invention is not limited thereto. Like components will be denoted by like reference numerals throughout the specification.

As used herein, spatially relative terms such as "upper" and "lower" are defined with reference to the accompanying drawings. Thus, it is to be understood that "upper" can be used interchangeably with "lower." It is to be understood that when a layer is referred to as being "on" another layer, it may be directly formed on the other layer, or one or more intervening layers may also be present. Thus, it is to be understood that when a layer is referred to as being "directly on" another layer, no intervening layer is interposed therebetween.

As used herein to represent a specific numerical range, the expression "X to Y" means "greater than or equal to X and less than or equal to Y (X≤ and ≤Y)".

Unless otherwise indicated, "surface resistance" means a surface resistance measured at 25° C.

The liquid crystal panel may include an upper substrate and a lower substrate facing each other, and a liquid crystal layer disposed between the upper and lower substrates. A touch sensor may be included between the upper substrate and the lower substrate to reduce the thickness of the liquid crystal display. Such structure is referred to as an in-cell type liquid crystal panel.

The inventors of the present invention have struggled to develop a polarizing plate having good operation in touch performance and touch sensitivity before and even after being left under conditions of high temperature and high humidity when the polarizing plate is laminated on an in-cell type liquid crystal panel, and having short recolor time of a polarizer against an electrostatic shock thereby obtaining high reliability. The polarizing plate may also have excellent durability, water resistance and good adhesive strength between the polarizer and the protective layer.

The bonding layer for polarizing plates formed between a polarizer and a protective layer is formed of a bonding composition for polarizing plates comprising poly(ethylenedioxythiophene) poly(styrenesulfonate)(PEDOT:PSS) and a salt of glyoxylic acid, thereby obtain a surface resistance of about $1\times10^8\Omega$/□ to about $1\times10^{12}\Omega$/□ both before and after the polarizing plate is left under conditions of high temperature and high humidity. Since the bonding layer for polarizing plates has a surface resistance of about $1\times10^8\Omega/\square$ to about $1\times10^{12}\Omega/\square$ and contains poly(ethylenedioxythiophene) poly(styrenesulfonate), the polarizing plate may secure touch performance and touch sensitivity before and even after being left under conditions of high temperature and high humidity respectively and may have short recolor time against an electrostatic shock thereby obtaining high reliability. Particularly, when the polarizing plate of the present invention is laminated on an in-cell type liquid crystal panel, it is possible to secure all of the aforementioned touch performance, touch sensing performance and reliability.

If the poly(ethylenedioxythiophene) poly(styrenesulfonate) is included in an anchor layer formed on the outermost layer of the polarizing plate, and when the polarizing plate is left at high temperature and high humidity for a long time, it is difficult to secure a surface resistance of about $1\times10^8\Omega/\square$ to about $1\times10^{12}\Omega/\square$ and touch performance and touch sensitivity may be degraded. If a bonding layer for polarizing plates includes an ITO (indium tin oxide) instead of poly(ethylenedioxythiophene) poly(styrenesulfonate), the surface resistance of the bonding layer was about $1\times10^8\Omega/\square$ to about $1\times10^{12}\Omega/\square$, but a polarizing plate obtained therefrom exhibited poor touch performance and touch sensitivity and the reliability was not good.

Hereinafter, a polarizing plate according to an embodiment of the present invention will be described with reference to FIG. 1.

Figure 1:
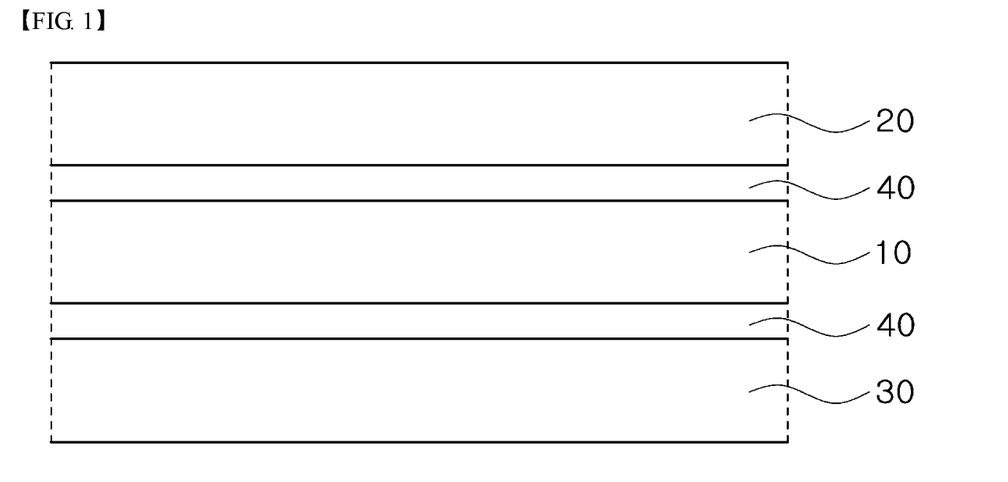
FIG. 1 is a sectional view of a polarizing plate according to one embodiment of the present invention.

Referring to FIG. 1, the polarizing plate may include a polarizer 10, a first protective layer 20 stacked on one surface of the polarizer 10, and a second protective layer 30 stacked on the other surface of the polarizer 10. The first protective layer 20 and the second protective layer 30 may be stacked on the polarizer by a bonding layer 40 for polarizing plates, respectively.

The bonding layer 40 for polarizing plates may attach the polarizer to the first protective layer and may attach the polarizer to the second protective layer, thereby retaining the external shape of the polarizing plate and mechanical strength. In an embodiment, the bonding layer 40 for polarizing plates is directly formed between the polarizer and the first protective layer, and between the polarizer and the second protective layer, respectively. Herein, "directly formed" means that any adhesive layer and/or any bonding layer is not interposed between the polarizer and the protective layer except the bonding layer for polarizing plates of the present invention.

The bonding layer 40 may be formed by a bonding composition for polarizing plates described in further detail below. Further, the bonding layer 40 may have a surface resistance of about $1\times10^8\Omega/\square$ to about $1\times10^{12}\Omega/\square$ before or even after the polarizing plate is left under conditions of high temperature and high humidity for a long period of time. Hence, when applied to the in-cell type liquid crystal panel, the polarizing plate may obtain excellent touch performance and touch sensing performance and may have short recolor time against an electrostatic shock thereby obtaining high reliability. The above surface resistance can be achieved by introducing a poly(ethylenedioxythiophene) poly(styrenesulfonate) into a bonding composition for polarizing plates, which will be described in more detail.

In an embodiment, the bonding layer 40 may have a surface resistance of about $1\times10^8\Omega/\square$ to about $1\times10^{12}\Omega/\square$, for example, about $1\times10^9\Omega/\square$ to about $1\times10^{11}\Omega/\square$ before leaving the polarizing plate under conditions of 85° C. and 85% RH for 250 hours. Within this range, when the polarizing plate is laminated on the in-cell type liquid crystal panel, touch performance may be normally operated, touch sensing performance is excellent and the polarizing plate may have short recolor time against an electrostatic shock thereby obtaining high reliability.

In an embodiment, the bonding layer 40 may have a surface resistance of about $1\times10^8\Omega/\square$ to about $1\times10^{12}\Omega/\square$, for example, about $1\times10^9\Omega/\square$ to about $1\times10^{11}\Omega/\square$ after leaving the polarizing plate under conditions of 85° C. and 85% RH for 250 hours. Within this range, when the polarizing plate is laminated on the in-cell type liquid crystal panel, touch performance may be normally operated, touch sensing performance is excellent and the polarizing plate may have short recolor time against an electrostatic shock thereby obtaining high reliability.

The polarizing plate may have a surface resistance ratio of greater than about 0 and less than or equal to about 1, for example, about 0.1 or more and about 1 or less, according to Equation 1. Within this range, the polarizing plate may increase a reliability of a liquid crystal display device and may provide high touch performance and high touch sensitivity between before and after being left under high temperature and high humidity conditions:

$$\text{surface resistance ratio} = SR2/SR1 \qquad \text{[Equation 1]}$$

(where SR1 is a surface resistance (unit: $\Omega/\square$) of the bonding layer for polarizing plate before leaving the polarizing plate under conditions of 85° C. and 85% RH for 250 hours, and SR2 is a surface resistance (unit: $\Omega/\square$) of the bonding layer for polarizing plate after leaving the polarizing plate under conditions of 85° C. and 85% RH for 250 hours).

For example, the polarizing plate may have a surface resistance ratio of about 0.01, 0.05, 0.1, 0.2, 0.3, 0.4, 0.5, 0.6, 0.7, 0.8, 0.9 or 1 according to Equation 1.

The above value of the surface resistance ratio according to Equation 1 can be achieved by introducing a poly(ethylenedioxythiophene) poly(styrenesulfonate) into a bonding composition for polarizing plates.

In one embodiment, the polarizing plate includes a polarizer, a first protective layer formed on a light exit surface of the polarizer, and a second protective layer formed on a light incident surface of the polarizer, wherein a bonding layer for polarizing plates formed between the polarizer and the first protective layer may satisfy the above surface resistance and the surface resistance ratio according to Equation 1.

In another embodiment, the polarizing plate includes a polarizer, a first protective layer formed on a light exit surface of the polarizer, and a second protective layer formed on a light incident surface of the polarizer. A bonding layer formed between the polarizer and the first protective layer and a bonding layer formed between the polarizer and the second protective layer may satisfy the above surface resistance and the surface resistance ratio according to Equation 1, respectively.

The bonding layer for polarizing plates not only has excellent adhesive strength for bonding the polarizer and the protective layer, but also increases water resistance and durability of the polarizing plate. In an embodiment, the polarizing plate may have a maximum length at which a first protective layer or second protective layer is peeled from the polarizer in the polarizing plate may be less than about 1 mm, for example, greater than or equal to about 0 mm and less than about 1 mm, wherein the maximum length is measured by using a specimen obtained by cutting the polarizing plate to a size of 50 mm×50 mm (length×width), attaching the specimen to a glass plate, completely immersing the specimen in water at 44° C., and being left for 12 hours. Within this range, the polarizing plate may have excellent water resistance, thereby the display may have improved reliability.

The poly(ethylenedioxythiophene) poly(styrenesulfonate) (PEDOT:PSS) may be present in an amount of about 1 wt % to about 50 wt %, specifically about 5 wt % to about 30 wt %, more specifically about 10 wt % to about 25 wt % in the bonding layer for polarizing plates. Within this range, there is no problem in touch performance and touch sensitivity even after severe conditions of 85° C. and 85% RH for 250 hours. For example, the poly(ethylenedioxythiophene) poly(styrenesulfonate)(PEDOT:PSS) may be present in an amount of about 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49 or 50 wt %.

The effects of the present invention described above can be realized by a bonding composition for polarizing plates described below. Hereinafter, the bonding composition for a polarizing plate will be described in detail.

The bonding composition for polarizing plates comprises a polyvinyl alcohol resin, a poly(ethylenedioxythiophene) poly(styrenesulfonate)(PEDOT:PSS) and a salt of glyoxylic acid.

The polyvinyl alcohol resin is a vinyl polymer, and may be superior to other adhesive resins in terms of adhesive strength when a polarizer is a polyvinyl alcohol-based polarizer.

The polyvinyl alcohol resin may include a polyvinyl alcohol or derivative thereof obtained by saponification of poly(vinyl acetate), a saponified product of a copolymer of vinyl acetate and copolymerizable monomer or a modified polyvinyl alcohol resin obtained by acetylation, urethanization, etherification, grafting or phosphoric acid esterification of polyvinyl alcohol. These compounds may be used alone or in combination of two or more. The copolymerizable monomer may include unsaturated carboxylic acids such as maleic anhydride, fumaric acid, crotonic acid, itaconic acid, (meth)acrylic acid and the like, or esters thereof; alpha-olefins such as ethylene and propylene and the like; (meth)allylsulfonic acid, and monoalkyl maleate, disulfonic acid sodium alkyl maleate, N-methylol acrylamide, acrylamide alkyl sulfonic acid alkali metal salt, N-vinylpyrrolidone, N-vinylpyrrolidone derivative, etc.

In an embodiment, the polyvinyl alcohol resin may comprise an acetoacetyl group-containing polyvinyl alcohol resin. The acetoacetyl group-containing polyvinyl alcohol resin may help to improve a water resistance of the bonding layer.

In an embodiment, the polyvinyl alcohol resin may have a degree of modification by an acetoacetyl group of about 1 mol % to about 30 mol %, for example, about 1 mol % to about 10 mol %. Within this range, it may provide a sufficient reaction point with a salt of glyoxylic acid, so that adhesive strength can be secured and water resistance of the polarizing plate can be increased. Methods of preparing the acetoacetyl group-containing polyvinyl alcohol resin are not particularly limited. In an embodiment, the acetoacetyl group-containing polyvinyl alcohol resin can be prepared by dispersing polyvinyl alcohol resin in acetic acid and adding diketene thereto.

The average polymerization degree and the average saponification degree of the polyvinyl alcohol-based resin are not particularly limited. In an embodiment, the polyvinyl alcohol resin may have an average polymerization degree of about 100 to about 3,000 and an average saponification degree of about 85 mol % to about 100 mol %. Within these ranges, sufficient adhesive strength between a polarizer and a protective layer can be obtained.

The polyvinyl alcohol resin may be present in an amount of about 1 part by weight to about 20 parts by weight, specifically about 1 part by weight to about 10 parts by weight, relative to 100 parts by weight of a solvent of the bonding composition for polarizing plates, for example, an aqueous solvent. Within this range, the bonding layer for polarizing plates can exhibit sufficient adhesive strength and good workability while suppressing a rapid increase in viscosity of the bonding composition. For example, the polyvinyl alcohol resin may be present in an amount of about 1, 2, 3, 4, 5, 6, 7, 8, 9, 10, 11, 12, 13, 14, 15, 16, 17, 18, 19 or 20 parts by weight.

The poly(ethylenedioxythiophene) poly(styrenesulfonate) may be present in an amount of about 5 parts by weight to about 30 parts by weight, for example, about 10 parts by weight to about 20 parts by weight, relative to 100 parts by weight of the polyvinyl alcohol resin. Within this range, the bonding layer for polarizing plates may secure a surface resistance of about $1 \times 10^8 \Omega/\square$ to about $1 \times 10^{12} \Omega/\square$, thereby providing excellent touch performance and touch sensitivity, while preventing problems of decrease in adhesion strength or optical transparency which can be caused by an excessive amount of the poly(ethylenedioxythiophene) poly(styrenesulfonate). In an embodiment, the poly(ethylenedioxythiophene) poly(styrenesulfonate) may be present in an amount of about 5, 6, 7, 8, 9, 10, 11, 12, 13, 14, 15, 16, 17, 18, 19, 20, 21, 22, 23, 24, 25, 26, 27, 28, 29 or 30 parts by weight.

The salt of glyoxylic acid may be introduced into a mixture of polyvinyl alcohol resins and poly(ethylenedioxythiophene) poly(styrenesulfonate) to crosslink polyvinyl alcohol resins even in the presence of poly(ethylenedioxythiophene) poly(styrenesulfonate), thereby achieving good adhesive strength, increased durability and water resistance at the same time, while ensuring good dispersion of poly(ethylenedioxythiophene) poly(styrenesulfonate). The inventors have found that a bonding composition including a conventional crosslinking agent for crosslinking polyvinyl alcohol resin other than the salt of glyoxylic acid cannot exhibit the foregoing advantageous effects of the present invention. In an embodiment, the bonding composition for polarizing plates of the present invention comprises a salt of glyoxylic acid only as a crosslinking agent.

The salt of glyoxylic acid may include at least one of an alkali metal salt of glyoxylic acid and an alkaline earth metal salt of glyoxylic acid. For example, the salt of glyoxylic acid may include alkali metal salts of glyoxylic acid such as lithium glyoxylate, sodium glyoxylate, potassium glyoxylate and the like; an alkaline earth metal salts of glyoxylic acid such as magnesium glyoxylate, calcium glyoxylate, strontium glyoxylate, barium glyoxylate and the like. Among them, sodium glyoxylate may be preferably used.

The salt of glyoxylic acid may be included in the bonding composition as itself, and may also be included in the form of glyoxylate hydrate.

The salt of glyoxylic acid may be present in an amount of about 1 part by weight to about 50 parts by weight, for example, about 10 parts by weight to about 50 parts by weight, relative to a total of 100 parts by weight of the polyvinyl alcohol resin. Within this range, the bonding layer for polarizing plates may secure a surface resistance of about $1 \times 10^8 \Omega/\square$ to about $1 \times 10^{12} \Omega/\square$, increased water resistance and durability, while preventing problem of decrease in adhesion strength or optical transparency which can be caused by an excessive amount of the salt of glyoxylic acid. In an embodiment, the salt of glyoxylic acid may be present in an amount of about 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49 or 50 parts by weight.

In an embodiment, the bonding composition for polarizing plates may not contain other crosslinking agent such as at least one of a zirconium compound and polyethyleneimine.

The bonding composition for polarizing plates may further include an aqueous solvent. The aqueous solvent may disperse the polyvinyl alcohol resin, poly(ethylenedioxythiophene) poly(styrenesulfonate) and the salt of glyoxylic acid, thereby increasing a processability of the bonding composition. The aqueous solvent may include water and the like, but is not limited thereto.

The bonding composition for polarizing plates may further include additives well known in the art. The additives can provide additional functions to the adhesive film. Specifically, the additives may include at least one of reaction inhibitors, adhesion improvers, thixotropic agents, conductivity imparting agents, color modifiers, stabilizers, antioxidants, and leveling agents, without being limited thereto.

The bonding composition for polarizing plates may have a pH of about 1 to about 10, specifically about 2 to about 7. Within this range, gelation of the bonding composition does not occur and the poly(ethylenedioxythiophene) poly(styrenesulfonate) can be stably dispersed in a liquid phase.

The bonding composition for polarizing plates may have a surface resistance measured at room temperature (for example: 25° C.) of about $1 \times 10^8$ to about $1 \times 10^{12}$ (Ω/□) for a cured specimen obtained by curing the bonding composition for polarizing plate, and a surface resistance of about $1 \times 10^8$ to about $1 \times 10^{12}$ (Ω/□) for a specimen after leaving the cured specimen under conditions of 85° C. and 85% RH for 250 hours. The surface resistance can be measured by a method described in further detail below.

In an embodiment, the bonding layer for polarizing plates may not include an antistatic agent. The "antistatic agent" is a typical antistatic agent known to those skilled in the art. For example, the antistatic agent may be at least one of ITO, an ionic liquid, and a metal salt, but is not limited thereto. The metal salt may be the one conventionally used as an antistatic agent and may include, for example, an alkali metal salt, but is not limited thereto.

The bonding layer 40 for polarizing plates may have a thickness of about 10 nm to about 500 nm, specifically about 50 nm to about 100 nm. Within this range, the bonding layer can be used in the polarizing plate and can realize thickness reduction of the polarizing plate.

FIG. 1 shows an embodiment in which both the bonding layer 40 for polarizing plates disposed on a light exit surface of the polarizer and the bonding layer 40 for polarizing plates disposed on a light incident surface of the polarizer are formed of the aforementioned bonding composition for polarizing plates. However, the bonding layer formed of the aforementioned bonding composition for polarizing plates may be disposed only on either the light exit surface or the light incident surface of the polarizer.

The polarizer 10 may include a conventional polarizer known to those skilled in the art. For example, the polarizer may include a polarizer manufactured from a polyvinyl alcohol (PVA)-based resin film or a polypropylene (PP)-based resin film. Specifically, the polarizer may be a polyvinyl alcohol-based polarizer manufactured by dyeing the polyvinyl alcohol-based resin film with at least one of iodine and a dichroic dye, or may be a polyene-based polarizer manufactured by dehydrating the polyvinyl alcohol-based resin film. The polyvinyl alcohol-based resin film may have a saponification degree of about 85 mol % to about 100 mol %, for example, about 98 mol % to about 100 mol %. The polyvinyl alcohol-based resin film may have a polymerization degree of about 1,000 to about 10,000, specifically about 1,500 to about 10,000. Within the above numerical ranges, a polarizer can be prepared.

The polarizer 10 may be prepared by a conventional method known to those skilled in the art. The polarizer 10 may have a thickness of about 5 μm to about 30 μm, specifically about 5 μm to about 25 μm. Within this range, the polarizer can be used in the polarizing plate and can realize thickness reduction of the polarizing plate.

Each of the first protective layer 20 and the second protective layer 30 is formed on each side of the polarizer to protect the polarizer. The first protective layer 20 may be formed of the same composition as or a different composition from the second protective layer 30. The first protective layer 20 may have the same thickness as or a different thickness from the second protective layer 30.

The first protective layer may include an optically transparent protective film or protective coating layer known to those skilled in the art. For example, the protective film may include at least one of cellulose ester resins including triacetylcellulose (TAC), cyclic polyolefin resins including amorphous cyclic olefin polymer (COP), polycarbonate resins, polyester resins including polyethylene terephthalate (PET), polyether sulfone resins, polysulfone resins, polyamide resins, polyimide resins, non-cyclic polyolefin resins, polyacrylate resins including poly(meth)acrylate resins, polyvinyl alcohol resins, polyvinyl chloride resins, and polyvinylidene chloride resins.

The first protective layer may have a thickness of about 5 μm to about 200 μm, for example, about 30 μm to about 120 μm. In an embodiment, the protective film may have a thickness of about 10 μm to about 100 μm, and the protective coating layer may have a thickness of about 1 μm to about 50 μm. Within this range, the first protective layer can be used in a light emitting display.

Although not shown in FIG. 1, an adhesive layer may be further formed on a lower surface of the polarizing plate, that is, on a lower surface of the second protective layer. The adhesive layer may attach the polarizing plate to a liquid crystal panel. The adhesive layer may be formed of a conventional adhesive known to those skilled in the art. For example, the adhesive layer may be formed of a (meth) acrylic adhesive. In an embodiment, the adhesive layer may not include an antistatic agent.

The polarizing plate of the present invention may include an antistatic agent in an adhesive layer, but even if the antistatic agent is not included in the adhesive layer, the bonding layer for polarizing plates may have antistatic properties. The "antistatic agent" is a typical antistatic agent known to those skilled in the art. For example, the antistatic agent may be at least one of ITO, an ionic liquid, and a metal salt, but is not limited thereto.

An optical display device according to an embodiment of the present invention may include a polarizing plate according to embodiments of the present invention.

In an embodiment, the optical display device may comprise a liquid crystal display.

In an embodiment, the polarizing plate of the present invention can be used as a viewer-side polarizing plate in a liquid crystal display.

Figure 2:
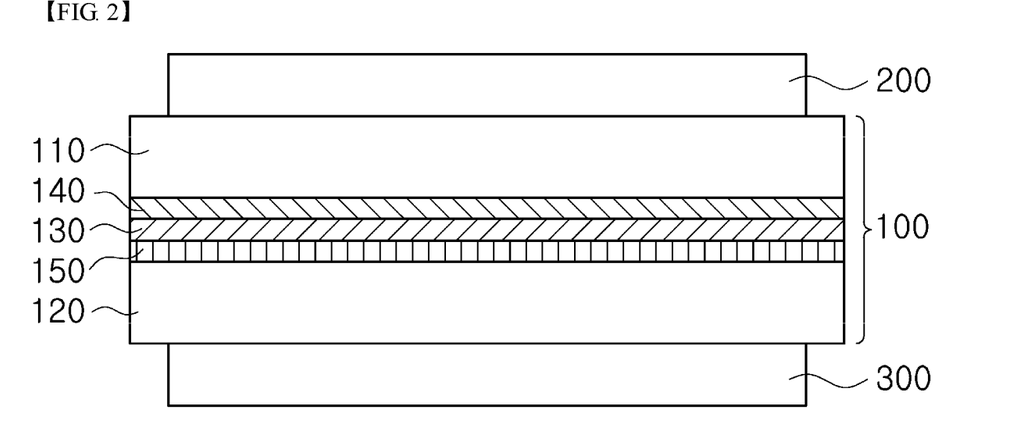
FIG. 2 is a sectional view of an optical display device according to one embodiment of the present invention.

Referring to FIG. 2, a liquid crystal display includes an in-cell type liquid crystal panel 100, a first polarizing plate 200 disposed on a light exit surface of the in-cell type liquid crystal panel 100, and a second polarizing plate 300 disposed on a light incident surface of the in-cell type liquid crystal panel 100, wherein the first polarizing plate 200 may include the polarizing plate according to the present invention.

The in-cell type liquid crystal panel 100 includes a first substrate 110, a second substrate 120 disposed to face the first substrate 110, a liquid crystal layer 130 interposed between the first substrate 110 and the second substrate 120, a touch sensor layer 140 interposed between the first substrate 110 and the liquid crystal layer 130, and driving electrodes and a sensor layer 150 interposed between the liquid crystal layer 130 and the second substrate 120.

The second polarizing plate 300 may include a typical polarizing plate well-known to those skilled in the art.

MODE FOR INVENTION

Next, the present invention will be described in more detail with reference to some examples. It should be understood that these examples are provided for illustration only and are not to be in any way construed as limiting the present invention.

Example 1

A polyvinyl alcohol film (Nippon Gohsei saponification degree: 99.5 mol %, polymerization degree: 2,000, thickness: 60 μm) was dipped in a 0.3% iodine aqueous solution to be dyed and then uniaxial stretched to 5.0 times. The stretched polyvinyl alcohol film was dipped in a 3% boric acid aqueous solution and a 2% potassium iodide aqueous solution to perform color correction, and then was dried at 50° C. for 4 minutes, thereby preparing a polarizer (thickness: 22 μm).

A bonding agent for polarizing plates was applied to one surface of the polarizer and a first triacetylcellulose film (thickness: 25 μm, Fuji Film Corporation) having a hard coating layer formed on one side of the first triacetylcellulose film was laminated thereon. Then, a bonding agent for polarizing plates was applied to the other surface of the polarizer and a second triacetylcellulose film (thickness: 20 μm, Konica, Zero TAC having no retardation) was laminated thereon, followed by heat curing in a drying oven at 50° C. for 1 minute and at 85° C. for 2 minutes to obtain a polarizing plate in which a first triacetylcellulose film—a bonding layer for polarizing plates (thickness: 100 nm)—a polarizer—a bonding layer for polarizing plates (thickness: 100 nm)—a second triacetylcellulose film was sequentially laminated.

An adhesive sheet having an acrylic adhesive layer formed on a release film was laminated onto the second triacetylcellulose film, followed by peeling the release film to prepare a polarizing plate.

The bonding agent for polarizing plates was prepared by the following method.

3 parts by weight of polyvinyl alcohol resin (Z200, average polymerization degree: 1100, saponification degree: 98.5 mol %, a degree of modification by an acetoacetyl group: 5 mol %) was added to 100 parts by weight of water at 95° C. and dissolved while stirring for 60 minutes. After cooling completely at room temperature, 25 parts by weight of poly(ethylenedioxythiophene) poly(styrenesulfonate) solution (ES-Chem, active ingredient: 1.2 wt %), 3 parts by weight of sodium glyoxylate solution (SPM-01, Nippon Synthetic Chemical Industry Co. Ltd, active ingredient: 10 wt %, water solvent) were further added thereto and agitated with a magnetic stirrer to obtain a bonding agent. Table 1 shows the amounts (unit: parts by weight) of poly(ethylenedioxythiophene) poly(styrenesulfonate) and sodium glyoxylate based on solid content, relative to 100 parts by weight of polyvinyl alcohol resin.

The adhesive sheet was prepared by the following method: In a reaction vessel equipped with a cooling tube, a nitrogen gas inlet tube, a thermometer and a stirrer, 100 parts by weight of butyl acrylate, 2 parts by weight of acrylic acid, 0.2 parts by weight of 2-hydroxyethyl acrylate, 0.3 parts by weight of 2,2-azobisisobutyronitrile were added together with ethyl acetate to prepare a solution. The solution was stirred under a nitrogen gas atmosphere and reacted at 60° C. for 6 hours to prepare an acrylic polymer solution having a weight average molecular weight of 1,700,000. Methyl ethyl ketone was added to the acrylic polymer solution to obtain an acrylic polymer solution having a solid content of 20%. Relative to 100 parts by weight of the solid content of the acrylic polymer solution, 0.3 parts by weight of a curing agent having an isocyanate group (L45, Soken Co. Ltd) and 0.05 parts by weight of a silane coupling agent (KBM-403, Shinyetsu) were added to obtain an adhesive solution. The adhesive solution was applied to a peel-treated polyethylene terephthalate film (thickness: 38 μm) so that the thickness after drying was 20 μm, and dried to prepare an adhesive sheet having an adhesive layer formed on the release film. The adhesive layer does not contain an antistatic agent.

Example 2 to Example 4

Each polarizing plate was prepared in the same manner as in Example 1 except that the amounts (unit: parts by weight) of poly(ethylenedioxythiophene) poly(styrenesulfonate) and sodium glyoxylate were changed as listed in Table 1.

Comparative Example 1 to Comparative Example 4

Each polarizing plate was prepared in the same manner as in Example 1 except that components and the contents thereof were changed as listed in Table 1. The content of each component in Table 1 is based on solid content, relative to 100 parts by weight of polyvinyl alcohol resin.

Comparative Example 5

3 parts by weight of polyvinyl alcohol resin (Z200, average polymerization degree: 1100, saponification degree: 98.5 mol %, a degree of modification by an acetoacetyl group: 5 mol %) and 3 parts by weight of sodium glyoxylate solution (SPM-01, Nippon Synthetic Chemical Industry Co. Ltd, active ingredient: 10 wt %, water solvent) were added to 100 parts by weight of water at 95° C. and dissolved while stirring for 60 minutes to obtain an adhesive. Then, a polarizing plate was prepared in the same manner as in Example 1 using the above adhesive.

A solution for outer conductive layer was prepared by mixing a carboxylic acid group-containing polyurethane acrylate (weight average molecular weight: 4,000 g/mol) solution (solid content: 25%), poly(ethylenedioxythiophene) poly(styrenesulfonate) (solid content: 1.2%) and N,N'-(methylenedi-p-phenylene)bis(aziridine-1-carboxamide) (Sthal, HDU-P25, solid content: 25 wt %, blocked isocyanate aziridine) as a bifunctional aziridine curing agent in a weight ratio of 90:10:0.01 based on the active ingredient. The solution for outer conductive layer was coated on the outer surface of the polarizing plate, that is on the surface of the second triacetylcellulose film, and dried at 80° C. for 2 minutes to form an outer conductive layer (thickness: 100 nm) including poly(ethylenedioxythiophene) poly(styrenesulfonate).

The compositions of bonding agent for polarizing plates used in Example 와 Comparative Example and the presence or absence of outer conductive layer is shown in Table 1 below:

TABLE 1

|  | A | B | C | D | E | F | G |
|---|---|---|---|---|---|---|---|
| Example1 | 20 | 10 | 0 | 0 | 0 | 0 | X |
| Example2 | 20 | 30 | 0 | 0 | 0 | 0 | X |
| Example3 | 20 | 50 | 0 | 0 | 0 | 0 | X |
| Example4 | 10 | 10 | 0 | 0 | 0 | 0 | X |
| Comparative Example1 | 20 | 0 | 10 | 0 | 0 | 0 | X |
| Comparative Example2 | 20 | 0 | 0 | 10 | 0 | 0 | X |
| Comparative Example3 | 0 | 10 | 0 | 0 | 5 | 0 | X |
| Comparative Example4 | 0 | 10 | 0 | 0 | 0 | 5 | X |
| Comparative Example5 | 0 | 10 | 0 | 0 | 0 | 0 | ○ |

*In Table 1,
A: Poly(3,4-ethylenedioxythiophene) poly(styrenesulfonate)
B: sodium glyoxylate
C: zirconium compound(Daiichi Kigenso Kagaku Kogyo, Zircosol ZN, active ingredient 36 wt %, water solvent)
D: polyethyleneimine (Nippon Shokubai Co., Ltd., SP018, active ingredient 98 wt %)
E: ITO(Indium Tin Oxide, water dispersion, NANOMAG Co. Ltd, NMIS-150, average diameter 50 nm, active ingredient: 15 wt %, ethanol solvent)
F: ionic liquid (CYASTAT SN, Needfill Co. Ltd.)
G: outer conductive layer containing poly(ethylenedioxythiophene)poly(styrenesulfonate)

The polarizing plates prepared in Examples and Comparative Examples were evaluated by the following physical properties and the results are shown in Table 2 below.

(1) surface resistance 1 (unit: Ω/□): Each of bonding agent for polarizing plates used in Examples and Comparative Examples 1-4 was applied to a primer-treated polyester film (PET, TA044, Toyobo, thickness: 80 μm) to form a coating layer. An unsaponified triacetylcellulose film (Zero TAC, KC2CT1W, Konica, thickness: 20 μm) was placed on the surface of the coating layer, and laminated using a roller, followed by drying a solvent in a drying oven at 50° C. for 1 minute and at 85° C. for 2 minutes. Then, the unsaponified triacetylcellulose film was removed to prepare a specimen with a surface of the bonding layer exposed. Surface resistance 1 was measured on the surface of the bonding layer exposed using a surface resistance tester (HT-450, Mitsubishi Chemical Co., Ltd.) at 25° C. with 10V for 10 seconds, followed by recording a surface resistance value.

For the solution for outer conductive layer prepared in Comparative Example 5, the solution for outer conductive layer was coated on one surface of an unsaponified triacetylcellulose film (Zero TAC, KC2CT1W, Konica, thickness: 20 μm) and dried in a drying oven at 80° C. for 2 minutes to obtain a specimen having an outer conductive layer with a thickness of 100 nm. Surface resistance 1 was measured on the outer conductive layer in the same manner as above.

(2) surface resistance 2 (unit: Ω/□): The specimens prepared in the above surface resistance 1 were left under conditions of 85° C. and 85% RH for 250 hours, followed by measuring surface resistance 2 in the same manner as in surface resistance 1.

(3) ESD: Each of the polarizing plate prepared in Examples and Comparative Examples was cut to a size of 10 cm×7 cm (length×width) to obtain a specimen. Using an electrostatic discharge gun, a voltage of 10 kV was applied to the surface of the first triacetylcellulose film of the specimen to measure a time taken for an area brightened by static electricity to be recolored again. The shorter the measured time, the more reliable the polarizing plate is with respect to an electrostatic shock.

◎: less than 2 seconds
○: 2 seconds or more and less than 5 seconds
Δ: 5 seconds or more and less than 10 seconds
X: 10 seconds or more (4) touch performance 1: Each of the polarizing plate prepared in Examples and Comparative Examples was attached to a liquid crystal panel of the Galaxy On 7 model to which an in-cell type liquid crystal panel manufactured by Samsung Electronics Co. Ltd., was applied. The touch performance 1 was evaluated by checking whether or not a touch function is performed, when a touch was made at the polarizing plate.

(5) touch performance 2: Each of the polarizing plate prepared in Examples and Comparative Examples was attached to a liquid crystal panel of the Galaxy On 7 model to which an in-cell type liquid crystal panel manufactured by Samsung Electronics Co. Ltd., was applied, followed by being left under conditions of 85° C. and 85% RH for 250 hours. After that, the touch performance 2 was evaluated by checking whether or not a touch function is performed, when a touch was made at the polarizing plate.

(6) water resistance: Each of the polarizing plate prepared in Examples and Comparative Examples was cut to a size of 50 mm×50 mm (length×width) to obtain a specimen. The specimen was attached to a glass plate, completely immersed in water at 44° C., and left for 12 hours. Then, a maximum length at which the triacetylcellulose film is peeled from the polarizer in the polarizing plate was measured. The water resistance was evaluated based on the following criteria with the maximum length.

◎: greater than or equal to 0 mm and less than 0.1 mm
○: greater than or equal to 0.1 mm and less than 1 mm
Δ: greater than or equal to 1 mm and less than 5 mm
X: greater than or equal to 5 mm

TABLE 2

| 구분 | surface resistance 1 | surface resistance 2 | Value of Equation 1 | ESD | touch performance 1 | touch performance 2 | water resistance |
|---|---|---|---|---|---|---|---|
| Example1 | $3.9 \times 10^9$ | $2.8 \times 10^9$ | 0.718 | ◎ | OK | OK | ○ |
| Example2 | $4.2 \times 10^9$ | $3.4 \times 10^9$ | 0.810 | ◎ | OK | OK | ○ |
| Example3 | $4.8 \times 10^9$ | $4.6 \times 10^9$ | 0.958 | ◎ | OK | OK | ◎ |
| Example4 | $1.2 \times 10^{10}$ | $9.6 \times 10^9$ | 0.8 | ◎ | OK | OK | ○ |
| Comparative Example1 | Over | Over | — | X | NG | NG | X |

TABLE 2-continued

| 구분 | surface resistance 1 | surface resistance 2 | Value of Equation 1 | ESD | touch performance 1 | touch performance 2 | water resistance |
|---|---|---|---|---|---|---|---|
| Comparative Example2 | Over | Over | — | X | NG | NG | X |
| Comparative Example3 | $5.5 \times 10^{11}$ | $9.3 \times 10^{11}$ | 1.691 | Δ | NG | NG | ○ |
| Comparative Example4 | Over | Over | — | X | NG | NG | ◎ |
| Comparative Example5 | $8.6 \times 10^{7}$ | $6.8 \times 10^{6}$ | 0.079 | ◎ | OK | NG | ◎ |

As shown in Table 2, the bonding layers for polarizing plates according to the present invention had a surface resistance of about $1 \times 10^8 \Omega/\square$ to about $1 \times 10^{12} \Omega/\square$ before the polarizing plate is left under conditions of high temperature and high humidity for a long period of time and also had a surface resistance of about $1 \times 10^8 \Omega/\square$ to about $1 \times 10^{12} \Omega/\square$ after the polarizing plate is left under conditions of high temperature and high humidity for a long period of time. Further, when the polarizing plate is laminated on an in-cell type liquid crystal panel, the polarizing plates exhibited excellent touch performance and touch sensitivity at room temperature and even at high temperature and high humidity and had short recolor time against an electrostatic shock thereby obtaining high reliability. Furthermore, the polarizing plate according to the present invention had excellent adhesive strength between the polarizer and the protective layer and showed good durability and water resistance.

On the contrary, the polarizing plate of Comparative Example 3 in which ITO is included in the bonding layer for polarizing plates instead of poly(ethylenedioxythiophene) poly(styrenesulfonate) exhibited poor touch performance and touch sensitivity and had low reliability, even though the surface resistance of the bonding layer was in the range of $1 \times 10^8 \Omega/\square$ to $1 \times 10^{12} \Omega/\square$. Further, the polarizing plate of Comparative Example 5 in which PEDOT:PSS is included in the outer conductive layer did not satisfy the surface resistance of the present invention, and touch performance was poor after being left at high temperature and high humidity for a long time.

It should be understood that various modifications, changes, alterations, and equivalent embodiments can be made by those skilled in the art without departing from the spirit and scope of the invention.

The invention claimed is:

1. A polarizing plate comprising:
   a polarizer; and
   a bonding layer for polarizing plates and a protective layer sequentially formed on at least one surface of the polarizer;
   wherein the bonding layer for polarizing plates comprises a poly(ethylenedioxythiophene) poly(styrenesulfonate) (PEDOT:PSS), and a crosslinking agent consisting of a salt of glyoxylic acid,
   wherein the bonding layer for polarizing plates has a surface resistance of about $1 \times 10^8 \Omega/\square$ to about $1 \times 10^{12} \Omega/\square$,
   wherein the bonding layer for polarizing plates has a surface resistance of about $1 \times 10^8 \Omega/\square$ to about $1 \times 10^{12} \Omega/\square$ after leaving the polarizing plate under conditions of 85° C. and 85% RH for 250 hours,
   wherein the bonding layer for polarizing plates comprises the PEDOT:PSS stably dispersed throughout in an amount of about 8 wt % to about 20 wt %,
   wherein the bonding layer for polarizing plates is formed of a bonding composition for polarizing plates comprising the PEDOT:PSS, a polyvinyl alcohol resin and the salt of glyoxylic acid,
   wherein the salt of glyoxylic acid is present in an amount of 26 parts by weight to about 50 parts by weight relative to 100 parts by weight of the polyvinyl alcohol resin, and
   the PEDOT:PSS is present in an amount of about 10 parts by weight to about 20 parts by weight relative to 100 parts by weight of the polyvinyl alcohol resin.

2. The polarizing plate according to claim 1, wherein the polarizing plate has a surface resistance ratio of greater than about 0 and less than or equal to about 1 according to Equation 1:

$$\text{surface resistance ratio} = SR2/SR1 \qquad \text{[Equation 1]}$$

where SR1 is a surface resistance (unit: $\Omega/\square$) of the bonding layer for polarizing plates before leaving the polarizing plate under conditions of 85° C. and 85% RH for 250 hours, and SR2 is a surface resistance (unit: $\Omega/\square$) of the bonding layer for polarizing plates after leaving the polarizing plate under conditions of 85° C. and 85% RH for 250 hours.

3. The polarizing plate according to claim 1, wherein the bonding layer for polarizing plates comprises PEDOT:PSS in an amount of about 10 wt % to about 20 wt %.

4. The polarizing plate according to claim 1, wherein the salt of glyoxylic acid is present in an amount of about 30 parts by weight to about 50 parts by weight based on 100 parts by weight of the polyvinyl alcohol resin.

5. The polarizing plate according to claim 1, wherein the salt of glyoxylic acid includes at least one of lithium glyoxylate, sodium glyoxylate, potassium glyoxylate, magnesium glyoxylate, calcium glyoxylate, strontium glyoxylate, and barium glyoxylate.

6. An optical display device comprising the polarizing plate according to claim 1.

7. The optical display device according to claim 6, wherein the optical display device includes an in-cell type liquid crystal panel, a first polarizing plate disposed on a light exit surface of the in-cell type liquid crystal panel, and a second polarizing plate disposed on a light incident surface of the in-cell type liquid crystal panel, wherein the first polarizing plate includes the polarizing plate.

8. The optical display device according to claim 7, wherein the in-cell type liquid crystal panel includes a first substrate, a second substrate disposed to face the first substrate, a touch sensor layer and a liquid crystal layer interposed between the first substrate and the second substrate.

9. A bonding composition for polarizing plates comprising an aqueous solvent, a polyvinyl alcohol resin, a poly (ethylenedioxythiophene) poly(styrenesulfonate)(PEDOT: PSS) and a salt of glyoxylic acid, the bonding composition has a pH of 2 to 7, the polyvinyl alcohol resin is present in an amount of about 1 part by weight to about 10 parts by weight, relative to 100 parts by weight of the aqueous solvent, and the salt of glyoxylic acid is present in an amount of 26 parts by weight to about 50 parts by weight, and the poly(ethylenedioxythiophene) poly(styrenesulfonate) (PEDOT:PSS) is present in an amount of about 10 parts by weight to about 20 parts by weight, each relative to 100 parts by weight of the polyvinyl alcohol resin.

10. The bonding composition for polarizing plates according to claim 9, wherein the salt of glyoxylic acid includes at least one of lithium glyoxylate, sodium glyoxylate, potassium glyoxylate, magnesium glyoxylate, calcium glyoxylate, strontium glyoxylate, and barium glyoxylate.

11. The bonding composition for polarizing plates according to claim 9, wherein the polyvinyl alcohol resin comprises a polyvinyl alcohol resin having a degree of modification by an acetoacetyl group of about 1 mol % to about 30 mol %.

12. The bonding composition for polarizing plates according to claim 9, wherein the bonding composition forms a bonding layer for polarizing plates that has a surface resistance at 25° C. of about $1 \times 10^8 \Omega/\square$ to about $1 \times 10^{12} \Omega/\square$, as measured with a cured specimen obtained by curing the bonding composition for polarizing plates, and a surface resistance at 25° C. of about $1 \times 10^8 \Omega/\square$ to about $1 \times 10^{12} \Omega/\square$, as measured with a specimen obtained by leaving the cured specimen under conditions of 85° C. and 85% RH for 250 hours.

\* \* \* \* \*